(12) United States Patent
Breedvelt-Schouten et al.

(10) Patent No.: US 8,677,269 B2
(45) Date of Patent: Mar. 18, 2014

(54) CREATING AND MAINTAINING A SINGULAR UNINTERRUPTED FOCUS WHILE TRANSITIONING THROUGH A GRADUATED USER INTERFACE

(75) Inventors: Ilse M. Breedvelt-Schouten, Ottawa (CA); Matthew Chmiel, Ottawa (CA); David D. Dewar, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 12/721,686

(22) Filed: Mar. 11, 2010

(65) Prior Publication Data

US 2011/0225528 A1 Sep. 15, 2011

(51) Int. Cl.
*G06F 3/048* (2013.01)

(52) U.S. Cl.
USPC .......................................................... 715/802

(58) Field of Classification Search
USPC .................. 715/767, 769, 802, 804
See application file for complete search history.

(56) References Cited

U.S. PATENT DOCUMENTS

| 5,687,331 A | 11/1997 | Volk et al. |
| 6,981,229 B1 | 12/2005 | Balakrishnan et al. |
| 7,057,625 B2 | 6/2006 | Kamata et al. |
| 7,234,114 B2 | 6/2007 | Kurtz et al. |
| 7,290,223 B2 | 10/2007 | Decombe |
| 7,353,459 B2 | 4/2008 | Barbanson et al. |

OTHER PUBLICATIONS

Stasko et al., "Focus+Context Display and Navigation Techniques for Enhancing Radia, Space-Filling Hierarchy Visualizations," Technical Report GIT-GVU-00-12, Aug. 2000, IEEE, Symposium on Information Vizualization 2000.
Wu et al., "The Perceptual Eye View: A User-Defined Method for Information Vizualization," J. Jacko (ed.): Human-Computer Interaction, Part II, HCII 2007, LNCS 4551, pp. 181-190, Aug. 2007.

*Primary Examiner* — Thanh Vu
(74) *Attorney, Agent, or Firm* — Cantor Colburn LLP; Yeen Tham

(57) ABSTRACT

Method, device, and computer product for displaying a single focus on a device. A piece of content is displayed in a first application on a display of the device. The piece of content is enlarged to create a single focus on the piece of content on the display. Parameters of the piece of content are passed to a second application. The piece of content is duplicated as an identical piece of content in the second application, and the identical piece of content is visually exactly positioned behind the piece of content on the display. The piece of content is seamlessly swapped with the identical piece of content of the second application, so that the identical piece of content is visually positioned to be viewable by the user. Tools of the second application are visually presented in an incremental transition until the tools are viewable and available to the user.

4 Claims, 9 Drawing Sheets

CREATING AND MAINTAINING A SINGULAR UNINTERRUPTED FOCUS WHILE TRANSITIONING THROUGH A GRADUATED USER INTERFACE

BACKGROUND

Exemplary embodiments relate to computer applications, and more specifically, to creating and maintaining a singular uninterrupted focus while transitioning through applications.

Many times a user views many different pieces of content on a screen, e.g., such as in a dashboard. The user may click on a piece of content, such as a widget, in the dashboard to execute additional functionality. While the additional functionally is executing, the user's attention may be drawn to something else in the dashboard, or the user may lose focus.

BRIEF SUMMARY

According to one embodiment, a method is provided for displaying a single focus on a device. A piece of content in a first application is displayed on a display of the device. The piece of content is enlarged to create a single focus on the piece of content on the display of the device for a user. Parameters of the piece of content are passed to a second application. The piece of content is duplicated as an identical piece of content in the second application, and the identical piece of content is visually positioned behind the piece of content on the display of the device. The piece of content of the first application is seamlessly swapped with the identical piece of content of the second application, so that the identical piece of content is visually positioned on the display of the device to be viewable by the user. This swapping is not noticeable by the user. Tools of the second application are visually presented in an incremental transition until the tools are viewable on the display and available to the user.

Additional features are realized through the techniques of the present disclosure. Other systems, methods, apparatuses, and/or devices according to other embodiments are described in detail herein and are considered a part of the claimed invention. For a better understanding of the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features are apparent from the following detailed description taken in conjunction with the accompanying drawings in which:

DETAILED DESCRIPTION

In software usability, the locus of attention refers to the ability of the vast majority of computer users to only be able to focus on one thing at a time. A change in locus of attention can cause a time delay (that the user may not perceive) when she shifts from one view to another. Exemplary embodiments address issues related to software applications that have multiple visible pieces of content to allow a locus of attention to be created and maintained when transitioning though a view change in a graduated user interface.

For example, the Photoshop.com software application (of Adobe® Photoshop® software) allows users to edit photos from their library, but interrupts the locus of attention when loading the editing tools to manipulate the selected photo. Although Embedded Object Linking and Embedding (OLE) objects in applications such as Word of Microsoft Office® software maintain the loading of the editing tools of the embedded object, it does not create a singular focus for the user.

Exemplary embodiments provide a method through which a seamless transition from one view to another in a graduated user interface is achieved by a transition software module (TSM) 160 (discussed below) while creating and maintaining a singular uninterrupted focus on a piece of content. Accordingly, exemplary embodiments are configured to ensure that the user of the software application will not lose context, and therefore will not be potentially temporarily confused, as they transition from one view to another.

The transition software module (TSM) 160 of exemplary embodiments is particularly suited for interactive data exploration tools. For example, exemplary embodiments are configured to make sure that the user does not lose his or her train of thought as the user performs calculations, queries modifications, and makes changes in data visualization.

For many people, it is important that the graduated user experience moves along at the 'speed of thought', so that the user can gain access to various functionality as part of the 'natural flow' of using the product.

Figure 1:
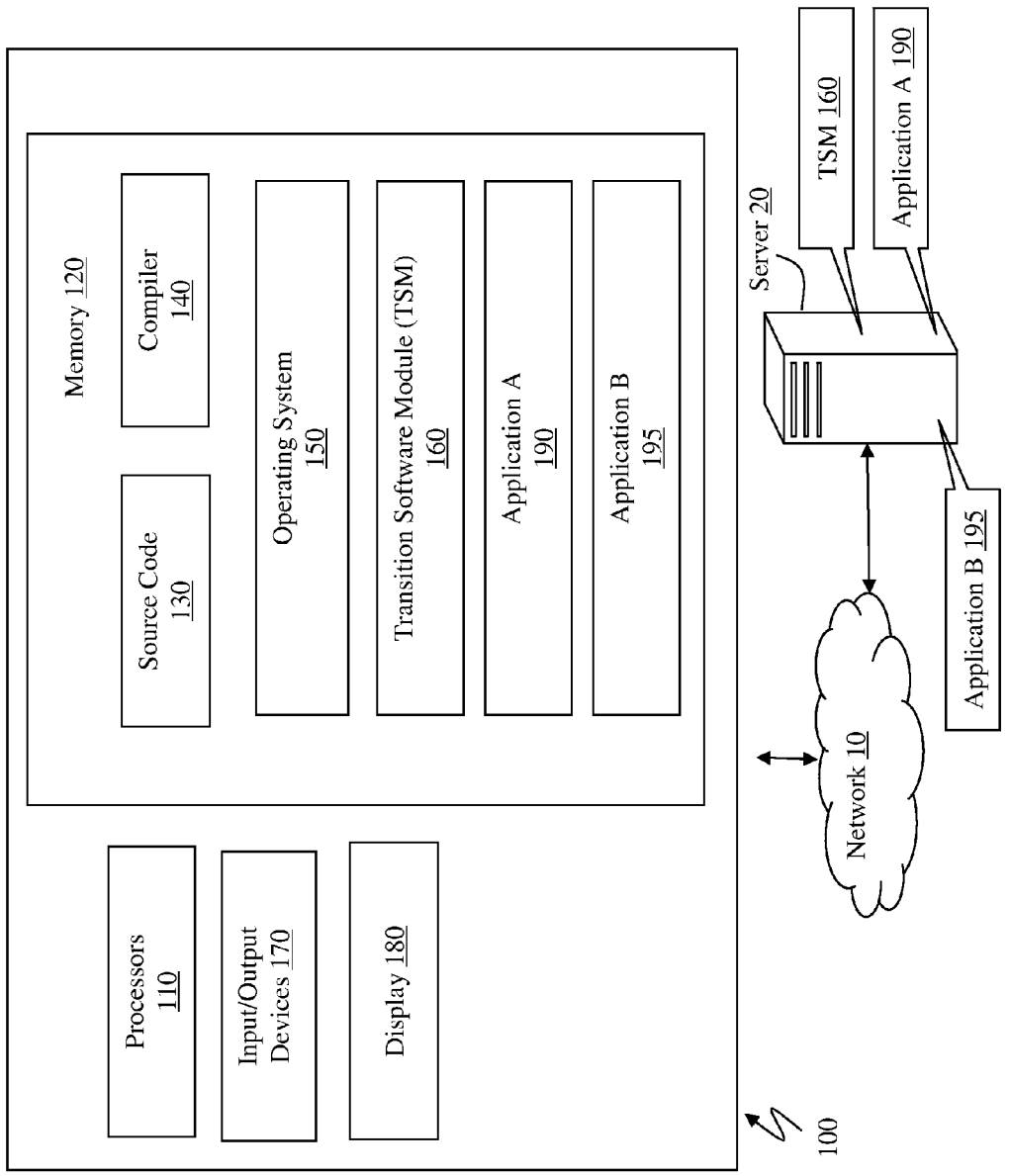
FIG. 1 illustrates a block diagram in accordance with exemplary embodiments.

Now turning to FIG. 1, FIG. 1 illustrates a block diagram in accordance with exemplary embodiments. In FIG. 1, an example of a computer 100 configured to implement exemplary embodiments is illustrated. Various methods, models, procedures, modules, processes, operations, flow diagrams, and techniques discussed herein may be incorporated in and/or utilize the capabilities of the computer 100. Moreover, although capabilities of the computer 100 may be utilized to implement features of exemplary embodiments discussed herein, it is understood that exemplary embodiments are not meant to be limited.

Generally, in terms of hardware architecture, the computer 100 may include one or more processors 110, computer readable storage memory 120, and one or more input and/or output (I/O) devices 170 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 110 is a hardware device for executing software that can be stored in the memory 120. The processor 110 can be virtually any custom made or commercially available processor, a central processing unit (CPU), a data signal processor (DSP), or an auxiliary processor among several processors associated with the computer 100, and the processor 110 may be a semiconductor based microprocessor (in the form of a microchip) or a macroprocessor.

The computer readable memory 120 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 120 may incorporate electronic, magnetic, optical, and/or other types of storage media. Note that the memory 120 can have a distributed architecture, where various components are situated remote from one another, but can be accessed by the processor 110.

The software in the computer readable memory 120 may include one or more separate programs, each of which comprises an ordered listing of executable instructions for implementing logical functions. The software in the memory 120 includes a suitable operating system (O/S) 150, compiler 140, source code 130, and one or more applications such as transition software module (TSM) 160, application A 190, and application B 195 of the exemplary embodiments. As illustrated, the transition software module (TSM) 160, application A 190, and application B 195 comprise numerous functional components for implementing the features, processes, methods, functions, and operations of the exemplary embodiments. The transition software module (TSM) 160, application A 190, and application B 195 of the computer 100 may represent numerous applications, agents, software components, modules, interfaces, controllers, etc., as discussed herein but the transition software module (TSM) 160, application A 190, and application B 195 are not meant to be a limitation.

The operating system 150 may control the execution of other computer programs, and provides scheduling, input-output control, file and data management, memory management, and communication control and related services.

The transition software module (TSM) 160, application A 190, and application B 195 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the transition software module (TSM) 160, application A 190, and application B 195 may be a source program, executable program (object code), script, or any other entity comprising a set of instructions to be performed. When a source program, then the program is usually translated via a compiler (such as the compiler 140), assembler, interpreter, or the like, which may or may not be included within the memory 120, so as to operate properly in connection with the O/S 150. Furthermore, the transition software module (TSM) 160, application A 190, and application B 195 can be written as (a) an object oriented programming language, which has classes of data and methods, or (b) a procedure programming language, which has routines, subroutines, and/or functions.

The I/O devices 170 may include input devices (or peripherals) such as, for example but not limited to, a mouse, keyboard, scanner, microphone, camera, pointing device, etc. Furthermore, the I/O devices 170 may also include output devices (or peripherals), for example but not limited to, a printer, display 180, etc. Finally, the I/O devices 170 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 170 also include components for communicating over various networks, such as the Internet or an intranet. The I/O devices 170 may be connected to and/or communicate with the processor 110 utilizing Bluetooth connections and cables (via, e.g., Universal Serial Bus (USB) ports, serial ports, parallel ports, FireWire, HDMI (High-Definition Multimedia Interface), etc.).

When the computer 100 is in operation, the processor 110 is configured to execute software stored within the memory 120, to communicate data to and from the memory 120, and to generally control operations of the computer 100 pursuant to the software. The transition software module (TSM) 160, application A 190, and application B 195 and the O/S 150 are read, in whole or in part, by the processor 110, perhaps buffered within the processor 110, and then executed.

When the transition software module (TSM) 160, application A 190, and application B 195 are implemented in software it should be noted that the transition software module (TSM) 160, application A 190, and application B 195 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The transition software module (TSM) 160, application A 190, and application B 195 can be embodied in any computer-readable storage medium 120 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable storage medium can be, for example but not limited to, an electronic, magnetic, optical, or semiconductor system, apparatus, or device.

More specific examples (a nonexhaustive list) of the computer-readable storage medium 120 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the transition software module (TSM) 160, application A 190, and application B 195 are implemented in hardware, the transition software module (TSM) 160, application A 190, and application B 195 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 100 includes non-limiting examples of software and hardware components that may be included in various devices, servers, and systems discussed herein, and it is understood that additional software and hardware components may be included in the various devices and systems discussed in exemplary embodiments.

Application A 190 is a base application. Application A 190 is configured to and capable of showing (implementing) multiple widgets at a time. A widget is a window/box that is a container for content. For example, the content may be described by a report specification. However, content for a widget could be almost anything as understood by one skilled in the art.

Application B 195 is configured as an additional tools application. The application B 195 is configured to and capable of advanced editing actions on the contents of a widget from application A 190. Although the transition software module 160, application A 190, and application B 195 are shown separately in FIG. 1, the transition software module 160, application A 190, and/or application B 195 may be configured as a single integrated software application with multiple software components and/or integrated in any combination.

The transition software module (TSM) 160 comprises software code that facilitates the transition between application A 190 and application B 195. The transition software module (TSM) 160 co-ordinates the transition (between application A 190 and application B 195) to be perceived (visually on the display 180) as seamless to the user and passes the necessary information between applications A 190 and B 195 required to accomplish this.

Figure 2:
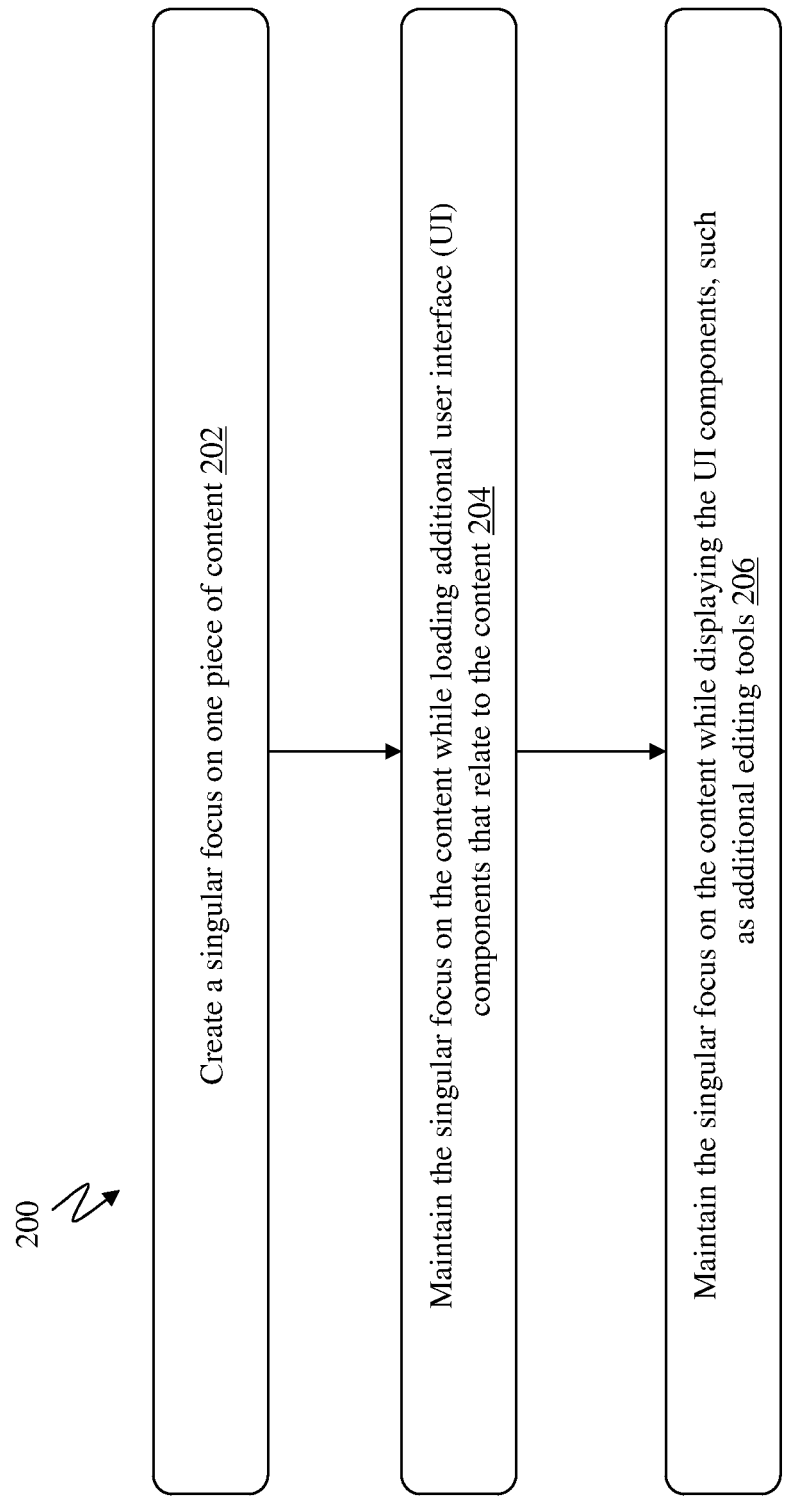
FIG. 2 illustrates a method by the transition software module (TSM) to create and maintain a singular uninterrupted focus while transitioning through a graduated user interface in accordance with exemplary embodiments.

FIG. 2 illustrates a method 200 by the transition software module (TSM) 160 to create and maintain a singular uninterrupted focus on a single piece of content while transitioning through a graduated user interface of the software application (such as the application A 190) with in accordance with exemplary embodiments. The transition software module (TSM) 160 is configured to focus the user's attention on 'information first'. The transition software module (TSM) 160 is configured to implement a user interface (such as a graphical user interface (GUI)), and the user interface of the transition software module (TSM) 160 is uncluttered and aims to maximize the view of, e.g., a dashboard, report, or other form of information (of, e.g., the base application A). When the user sees something of interest in the information, the user can access more powerful functionality 'on demand' via the transition software model 160. By the transition software module (TSM) 160, the user is able to access more powerful graduated (e.g., with a smooth transition while visually holding the user's attention to a single focus area) functionality and dig into the data to look for insights.

The transition software module (TSM) 160 operates as a singular focus software application configured to interface with other software applications, such as the application A 190 and the application B 195 as discussed herein.

In FIG. 2, the transition software module (TSM) 160 is configured to create a singular focus on one piece of content (of the application A 190) on the display 180 at operation 202. For example, on the display 180, the transition software module (TSM) 160 is configured to visually single out the selected piece of content and make the selected piece of content the only visible piece of content to the user through the use of a transition. By the transition software module (TSM) 160, this can be implemented by means of an animated transition to visually enlarge the selected content so that no other content is visible on the display 180.

The transition software module (TSM) 160 is configured to maintain the singular focus on the content (of the application A 190) while loading additional user interface (UI) components (e.g., application B 195) that relate to the content on the display 180 at operation 204. During the loading of the UI components such as editing tools (e.g., the application B 195), the transition software module (TSM) 160 is configured to hold and enlarge the content such that the selected content never disappears from view during the loading process. Any loading of the editing tools UI components (e.g., the application B 195) and graphical user interface of the editing tools is held in the background (not seen by the user) by the transition software module (TSM) 160 while the enlarged selected content is displayed in the front (i.e., prominently seen by the user) by the transition software module (TSM) 160.

The transition software module (TSM) 160 is configured to maintain the singular focus on the content (of the application A 190) while displaying the UI components, such as additional editing tools (such as the application B 195), on the display 180 at operation 206. That is, the transition software module (TSM) 160 maintains the singular focus of the content on the display 180, so that the additional editing tools are revealed (e.g., by showing or animating in by means of a fade or slide in transition) in the environment in such a way that the focus of attention can remain on the content.

FIGS. 3A, 3B, 3C, 3D, 3E, 3F, and 3G (collectively referred to as FIG. 3) illustrate an example transitioning through a graduated user interface by the transition software module (TSM) 160 in accordance with exemplary embodiments.

With reference to FIG. 1, the transition software module (TSM) 160, the application A 190, and/or the application B 195 may be coupled to the computer 100, may be hosted on a server 20, and/or be partially (e.g., have software components) on the computer 100 and the server 20. Although not shown for conciseness, the server 20 may include suitable processors 110, memory 120, source code 130, compiler 140, and input/output device 170 for operating the server 20 as understood by one skilled in the art. Moreover, the server 20 may include any part (or all) of various software and hardware components discussed herein for the computer 100. The application A 190 may be a dashboard software application utilized for hosting mini-applications known as widgets, as mentioned herein. Dashboard widgets, like web pages, are capable of many different things, often to perform tasks for the user to access. Although the dashboard implemented by the application A 190 is utilized for explanation purposes, it is contemplated that the graduated transition (of tools, such as editing tools) by the transition software module (TSM) 160 can be utilized for any other type of software application.

Figure 3A:
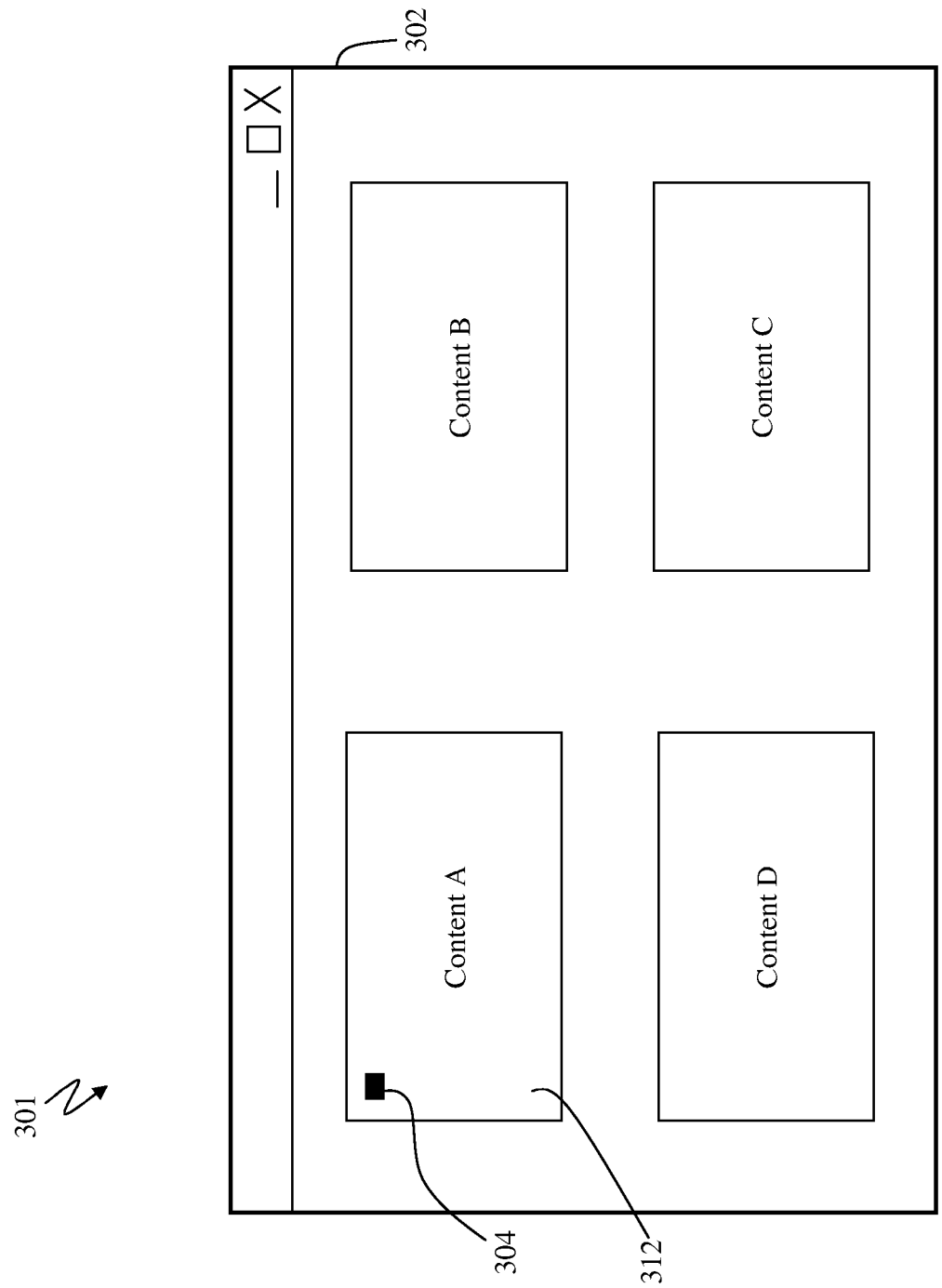
FIGS. 3A-3G illustrates example views in accordance with exemplary embodiments.

In view 301 of FIG. 3A, the application A 190 illustrates an initial state. The application A 190 may be a dashboard application, and the application A 190 is in a state where it is displays four different widgets. The dashboard of application A 190 (or any type of commonly utilized software application) may generate a box 302 for display on the display 180. The box 302 may be a web browser (type) box 302, such as Internet Explorer®, and/or the box 302 may be any window that is a visual area containing some kind of user interface. The box 302 displays the output of and may allow input to one or more processes as understood by one skilled in the art.

The box 302 is shown with four widgets, which are four pieces of content. The four pieces of content are content A, content B, content C, and content D. The widgets may be interactive such that the user can make selections via the input device 170 (e.g., a mouse). The user may choose to perform an action on content A 312 which is a widget that is displaying a report specification. In this example implementation, the user may click an edit button 304 on the widget content A 312 via the mouse 170, but this could be accomplished in other ways as understood by one skilled in the art. As such, the user may select via the mouse 170 to initiate additional editing tools and/or any kind of selection related to and for content A. Prior to the selection of the editing tools for content A 312, the user visually sees view 301. Also, in the view 301, the user would see the selection state in the content A 312. The selection state refers to the currently selected item(s) (selected by the user) in the content A 312, and this selection state is also visually represented (not shown in the FIG. 3 for conciseness) to the user.

Figure 3B:
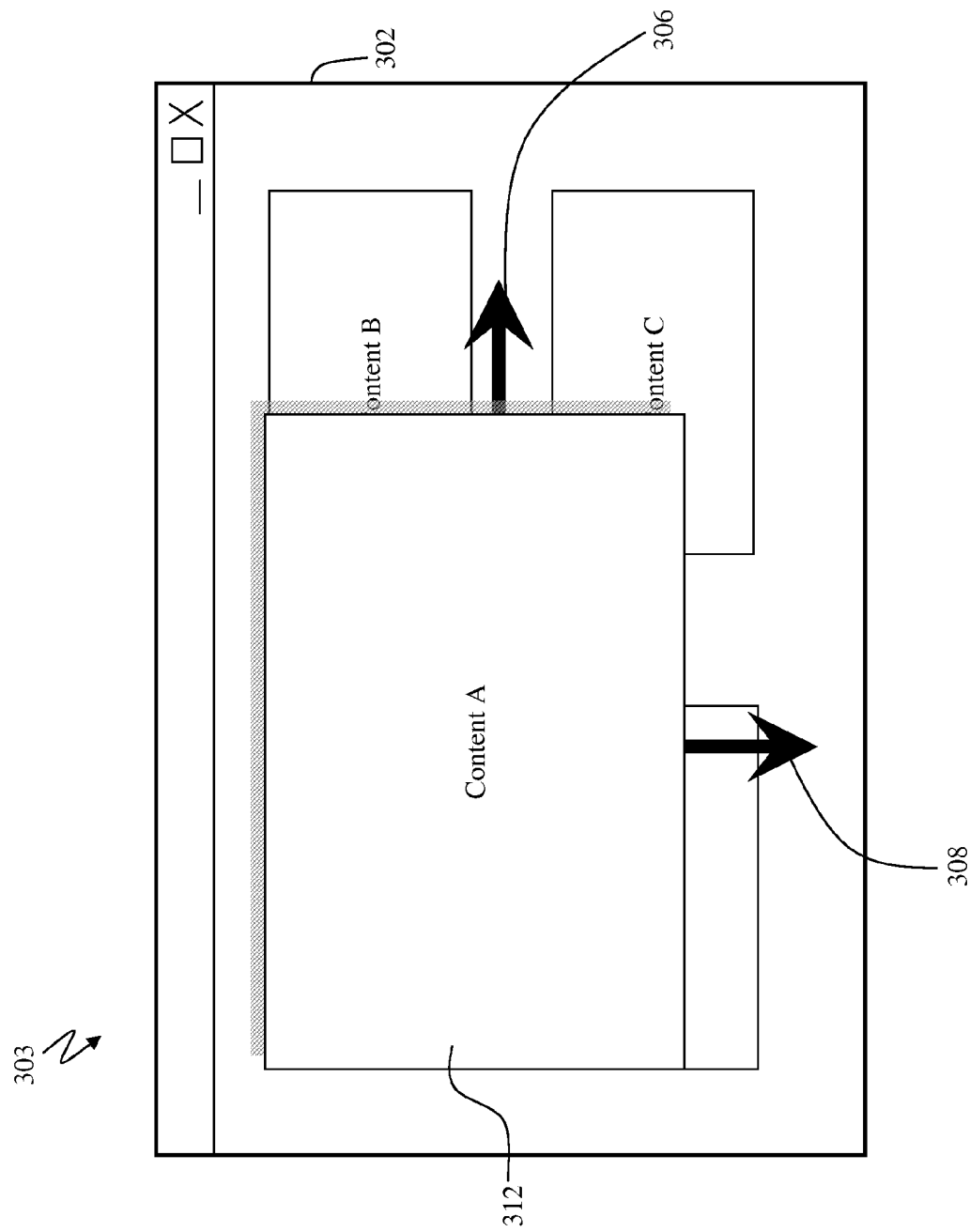

Turning to FIG. 3B, after the user invokes the selection of edit button 304 to get additional tools contained in application B 195, the transition software module (TSM) 160 is invoked to facilitate the transition. First, the transition software module (TSM) 160 will store (e.g., in RAM of the memory 120) the size and position of the widget content A 312 window in the box 302, before moving the widget that contains content A 312 to the top (i.e., content A is moved above all the other widgets, such as content B, content C, and content D) on the box 302 (screen). Then, the transition software module (TSM) 160 animates the widget content A 312 to visually grow (enlarge) to fill the available space within the application A 190 window (box 302). While the content A 312 is growing the transition software module 160 may prevent the user from interacting (executing) content B, C, and/or D.

For example, the transition software module (TSM) 160 is configured to recognize and receive the selection (via button 304) of the editing tools of application B for content A 312. For example, the transition software module (TSM) 160 is configured to interact with the software of the application A 190 (e.g., as a plug-in) so that the transition software module (TSM) 160 is automatically triggered and executed in response to the user selecting button 304 for editing tools for the content A 312. In response to the selection by the user to invoke editing tools for content A 312, the transition software module (TSM) 160 is configured to create a singular focus on the content A 312 by an animated transition that enlarges content A 312 as shown in view 303.

View 303 shows the transition software module (TSM) 160 creating a transition in which the content A 312 of the application A 190 is being enlarged in both a horizontal (shown by arrow 306) and a vertical direction (shown by arrow 308) to cover any other content (widgets) on the display 180. That is, the transition software module (TSM) 160 is enlarging content A to cover content B, content C, and content D.

Figure 3C:
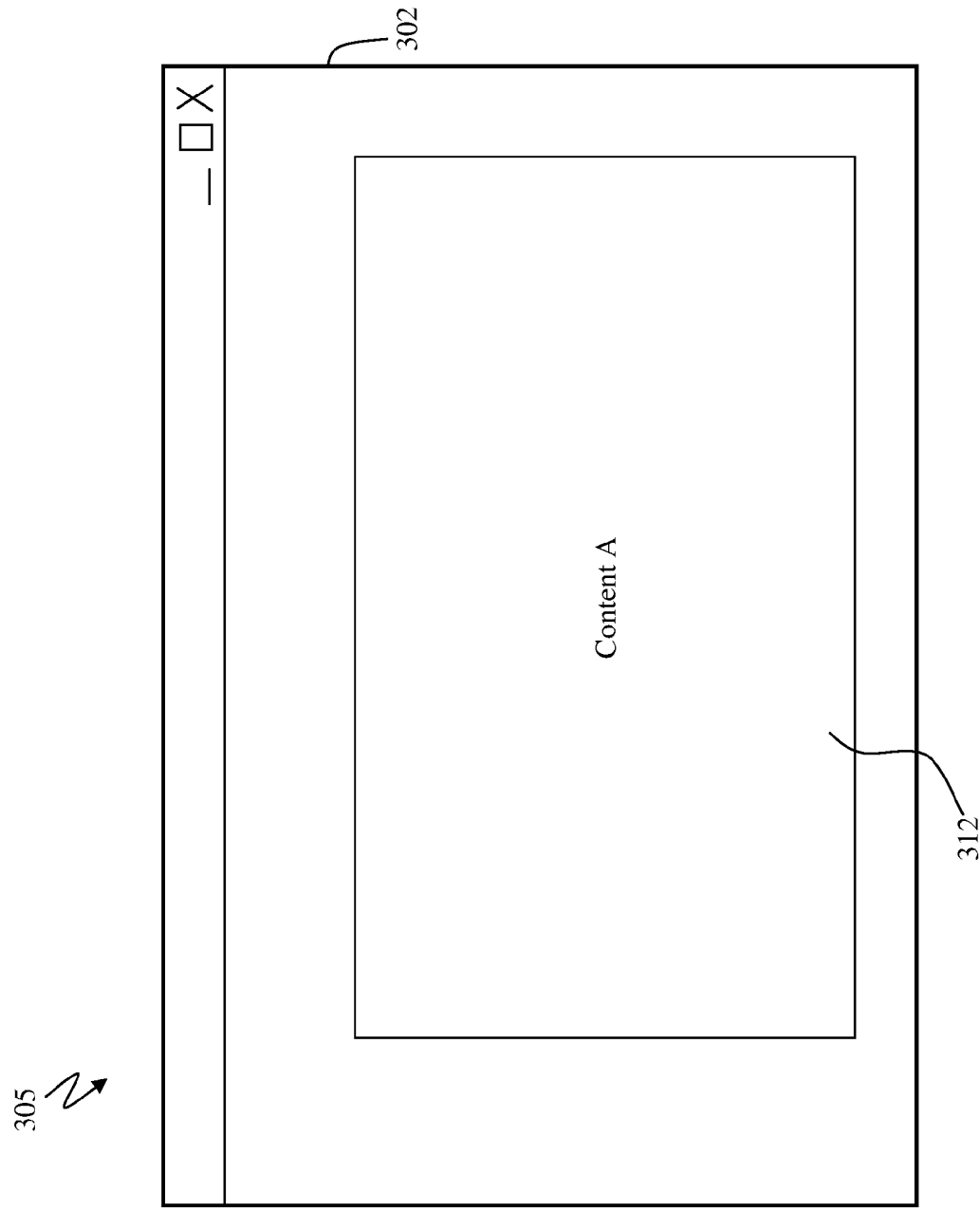
Figure 3D:
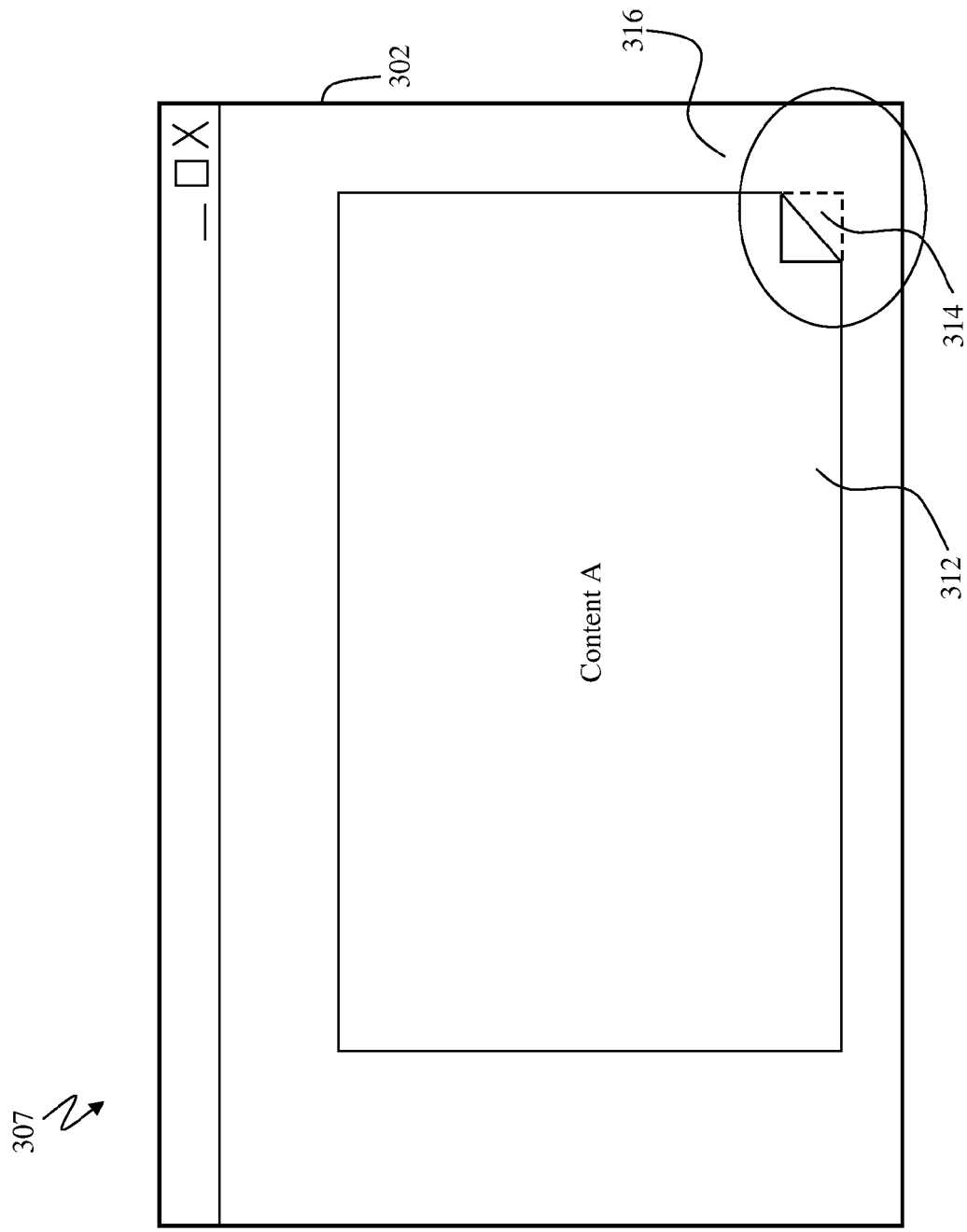

With reference to view 305 in FIG. 3C, after the animation is complete (i.e., enlarging the window of content A 312 to fill the box 302), a singular focus on content A 312 is maintained in the box 302 on the display 180 by the transition software module 160 while loading additional application B 195 (additional tools). The content A 312 will not disappear during this loading phase, but a loading message (not shown) may be displayed to the user to indicate that application B 195 is loading.

For example, the transition software module 160 will invoke application B 195 to start up in the background of content A 312. The transition software module 160 creates a duplicate copy of content A 312 in application B 195 as content A 314. On the display 180, the transition software module 160 is configured to position the content A 314 (window) of application B 195 in the exact same location as the content A 312 (widget) window, and size the content A 314 window of application B 195 to be the exact same as the window of content A 312. The transition software module 160 is configured to move the content A 314 (window) of application B 195 behind the content A (widget) 312 (window), so that the loading of content A 314 of application B 195 is (visually) hidden to the user on the display 180. As seen in view 307 of FIG. 3D, a circle 316 depicts a peek (directly and/or substantially directly) behind content A 312 which reveals the duplicate copy content A 314 of application B with dashed lines. Although not visually seen by (or apparent to) the user viewing the display 180, content A 314 of application B 195 is lined up with (and/or substantially lined up with) and behind the content A 312 of application A 190 by the transition software module 160.

As part of the startup for application B 195, the transition software module 160 will pass along the server state from application A 190 to application B 195, which will allow application B 195 to startup under the same user credentials, and security, etc, as application A 190 did. When creating the duplicate content A 314, when application B 195 is loading, application B 195 will notify the transition software module 160. The transition software module 160 will then request the report specification, any selection state in the content A 312, and prompt values (if any) from application A 190. The report specification, selection state in the content A 312, and prompt values from application A 190 (for content A 312) will also be passed into application B 195 (by the transition software module 160) which will load the report specification and apply the same prompt values as the user chose in application A 190 (this will prevent the user from having to re-answer the prompt questions).

The report specification is a document that describes the layout, styling and content of a report. The layout is the physical arrangement of items in a report specification. For example, the layout indicates where a title will appear, where a data table will appear, etc. Styling is the style applied to items in a report specification. For example, the title may be 14 pt font and blue, and/or the bars on a chart will be colored red. The server state is a set of name/value pairs that contain information for the current session the user is operating in. For example, the server state includes information such as the name the user has logged in under, his/her current locale, a uniquely generated user session ID, etc.

As mentioned above, the selection state refers to the currently selected item(s) in the content that the user visually sees. For example, if a cell in a table, in the content A 312 of the application A 190 were to be selected by the user, when transitioning to application B 195, the transition software module 160 request the selection state from application A 190 and pass the selection state to application B 195, so that when application B 195 created its duplicate content A 314, the duplicate content A 314 could also represent the same selection. This reinforces the user perception that he is making a seamless transition. Also, by passing the same initial selection state in the content A 312 of application A 190, the duplicate content A 314 in application B 195 can have the same paging as content A 312. As such, the user can continue with the interaction as intended while using the application B 195.

Prompt values are related to report specifications and can be configured to be parameterized. Upon opening a parameterized report in a widget, the user could be prompted to provide an answer to the prompt so that the report output will be filtered by the user's prompt answer. For example, if a report is parameterized on country data, when a user opens the report in a widget, the user will be prompted for which country (e.g., Canada, United States, etc) the user wants to be displayed in the report. After the user chooses a country, for example Canada, the report will be filtered to only show data for Canada.

Figure 3E:
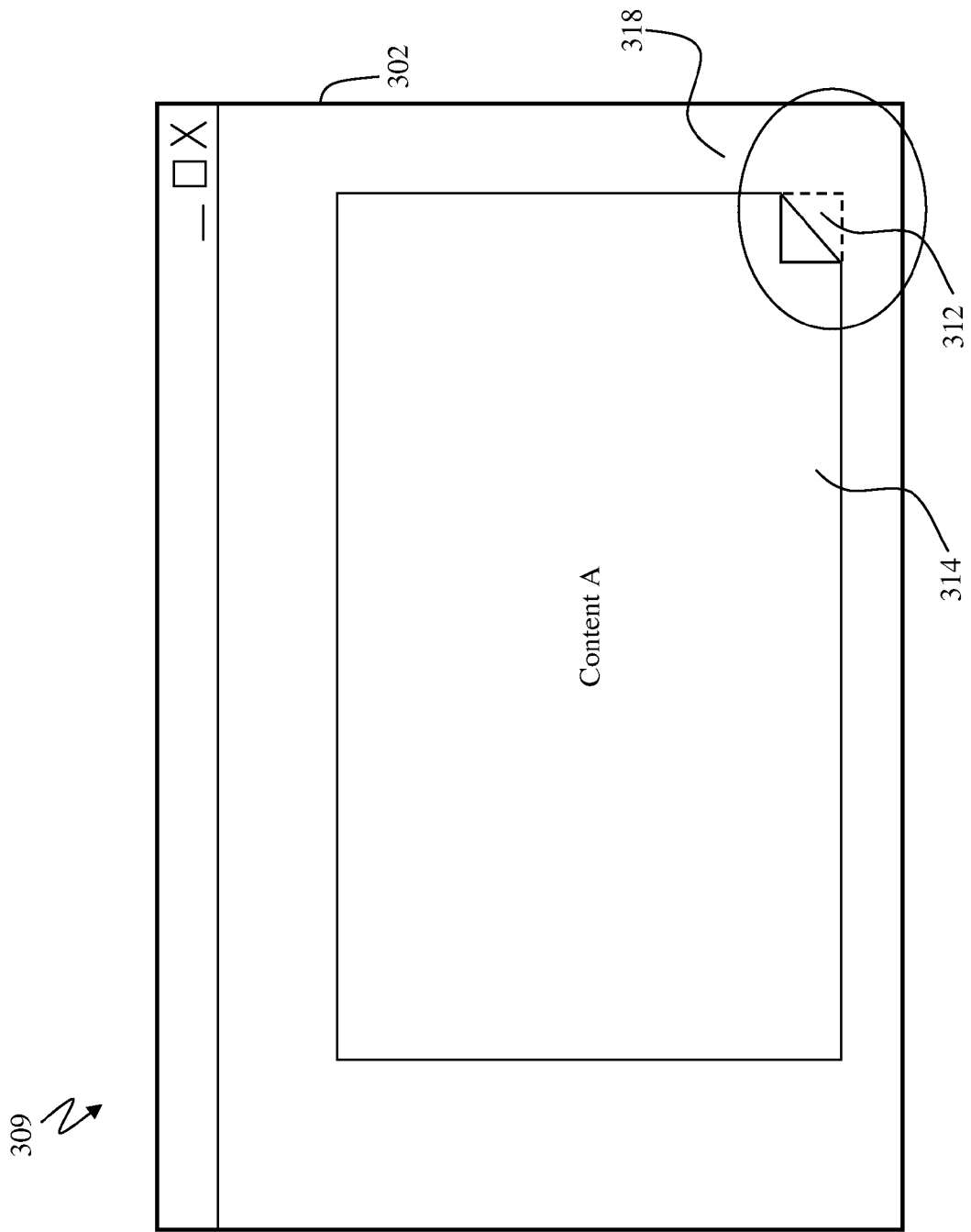

When application B 195 has completed loading the report specification, application B 195 will notify the transition software module 160. In response to the notification, the transition software module 160 will then (seamlessly) move the widget content A 312 window of the application A 190 behind the content A 314 window of application B 195, to thus reveal the duplicated content A 314 of application B 195 to the user in display 180. View 309 in FIG. 3E depicts that content A 314 of application B 195 is now on top of and covering content A 312 of application A 190 on the display 180. Circle 318 shows dashed lines to indicate that content A 312 is directly behind content A 314 but unseen by the user on display 180. Because content A 314 of application B 195 was positioned directly behind the widget content A 312 of application A 190 and because no tools are yet displayed in content A 314 of Application B 195, (they both) content A 312 and content A 314 will line up exactly, and the swap will be imperceptible to the user on display 180. Note that the circles 316 and 318 illustrating the dashed lines are for explanation purposes only and will not be seen by the user during the transition.

Figure 3F:
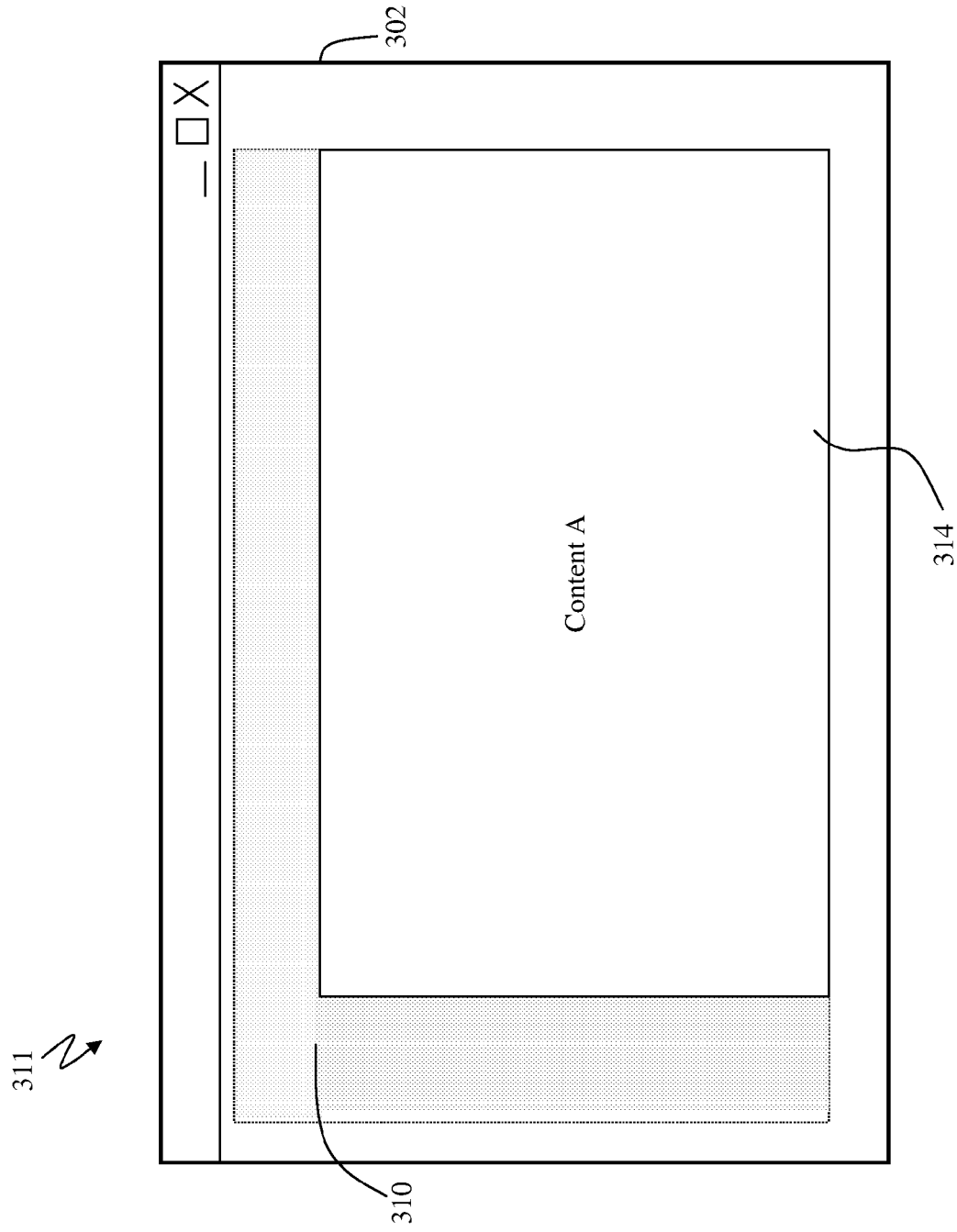

View 311 of FIG. 3F illustrates the transition software module 160 animating (transitioning) in the editing tools 310 of application B 195. Now that the content A 314 of application B is being displayed in place of the widget content A 312 of application A 190, the transition software model 160 causes application B to transition in (e.g., by showing or animating in by means of a fade in or slide in transition) its tools 310 (toolbars, buttons, menus, etc) on the display 180. The animated transition of the tools 310 allows the user's focus to remain on the content A 314.

Figure 3G:
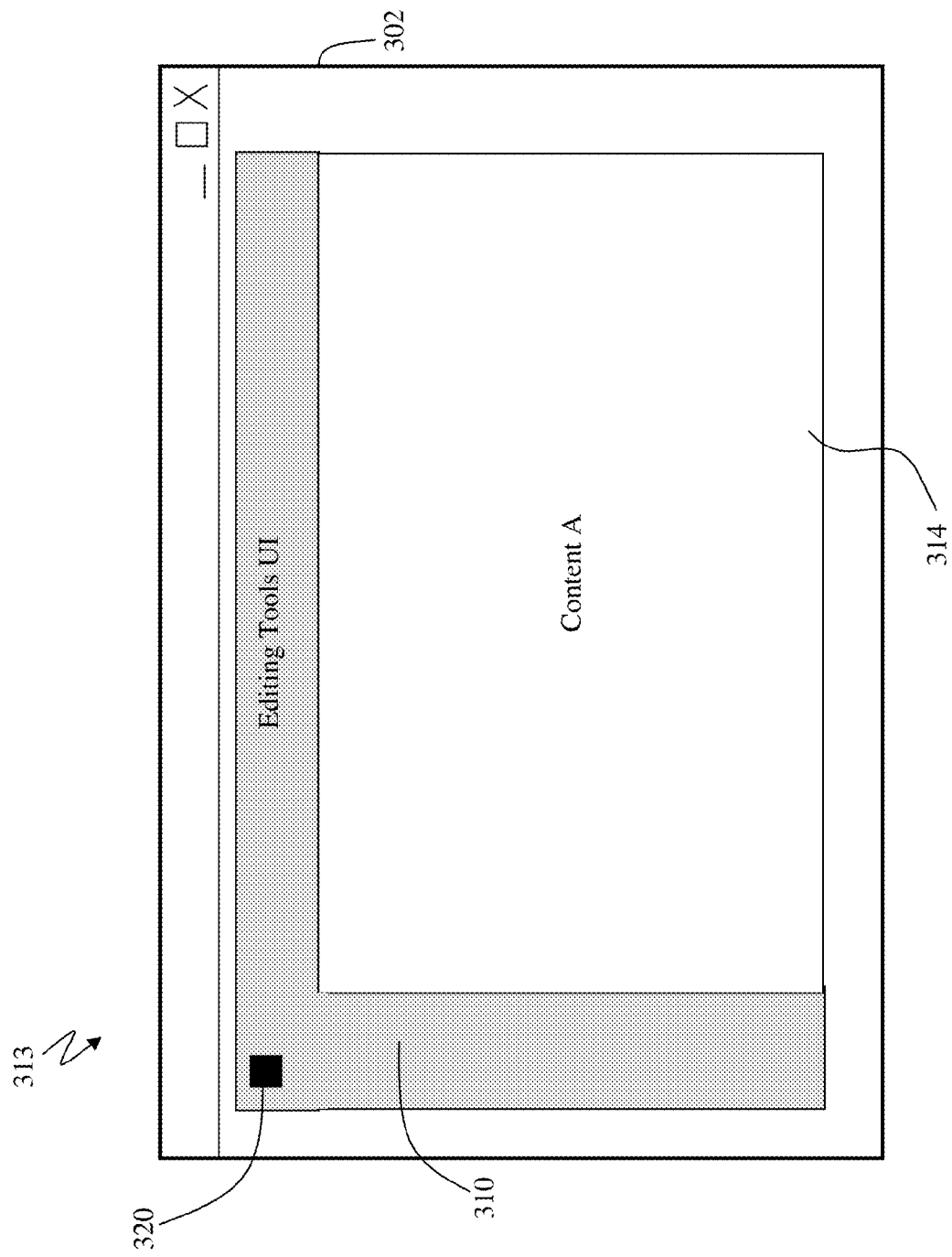

When the animation by the transition software module 160 of the tools 310 is complete, the user is free to work with the tools 310 in application B 195 on the content A 314 originally pulled from widget content A 312 of application A 190. View 313 of FIG. 3G illustrates the completed transition of the tools 310 of the application B 195 by the transition software module 160.

The graduated singular focus transition by the transition software module 160 works in both directions. For example, when the user desires to get back to application A 190 from application B 195, the transition software module 160 reverses the steps described above (in FIGS. 3A-3G). The user will invoke in application B 195 (e.g., by clicking button 320 with the mouse 170) that the user is done utilizing the additional tools 310 of application B 195. Application B 195 will notify the transition software module 160. In response to the notification, the transition software module 160 will request the report specification, the selection state, and the prompt values from application B 195 and pass them to application A 190. The application A 190 will load the report specification and selection state into the widget content A 312 hidden behind the content A 314 of application B 195. For example, the transition software module 360 causes application A 190 to update the content A 312 with the parameters of the content A 314 of the application B 195 so that any changes (which include selection state changes, such as the user selected a different cell in a table of content A 314) made by the user will now be included in content A 312. The transition software module 160 will and/or causes the application B 195 to hide its tools 310 (toolbars, buttons, menu, etc) (e.g., by hiding or animating out by means of a fade out or slide out transition), just as the tools 310 were revealed as shown in FIG. 3F. When application A 190 has finished loading the report specification in the widget content A 312, the application A 190 will notify the transition software module 160. In response, the transition software module 160 will hide the content A 314 of application B 195, to thus reveal the widget content A 312 that was behind the content A 314 (including any changes made to content A 314). Again, because the content A 312 and content A 314 are lined up exactly, this transition to show content A 312 of application A 190 by the transition software module 160 will be imperceptible to the user. The transition software module 160 will then animate the widget content A 312 back into its original position in application A 190 as shown in FIG. 3A. That is, the transition software module 160 will and/or cause the content A 312 to shrink back to its original size and relocate the content A 312 to its original position with respect content B, content C, and content D. The application B 195 and its content A 314 are closed by the transition software module 360.

Further, it is understood that although examples may indicate that the editing tools 320 may transition by fading in, it contemplated that the transition is not limited to fading in and/or fading out and the examples are provided for explanation purposes. For example, the tools 320 may slide in from the left, right, top, bottom, corners, etc. Also, the tools 320 may appear as a small representation (such as a small box or dot), and enlarge to full size. Likewise, for the reverse when the application B 195 is transitioning back to application A 190, the transition software module 160 can slide out the tools 320 in any direction and/or cause the tools 320 to reduce in size until they vanish from the view of the user.

Further regarding the network 30, the network 30 may include circuit-switched and/or packet-switched technologies and devices, such as routers, switches, hubs, gateways, etc., for facilitating communications between the computer 100 and the server 20. The network 30 may include wireline and/or wireless components utilizing, e.g., IEEE 802.11 standards for providing over-the-air transmissions of communications.

According to exemplary embodiments, the network 30 facilitates transmission of media (e.g., images, video, data, multimedia messaging, etc.) from content services provider systems to customers/users via devices through a broadband connection. In exemplary embodiments, the network 30 can be a managed IP network administered by a service provider, which can control bandwidth and quality of service for the communications discussed herein. The network 30 may be implemented in a wireless fashion, e.g., using wireless protocols and technologies, such as such as Wi-Fi®, WiMAX™, Bluetooth®, etc. The network 30 can also be a packet-switched network, such as a local area network, a wide area network, a metropolitan area network, an Internet network, or other similar types of networks. The network 30 may include a cellular communications network, a fixed wireless network, a wireless local area network (LAN), a wireless wide area network (WAN), a personal area network (PAN), a virtual private network (VPN), an intranet or any other suitable network, and the network 30 may each include equipment for receiving and transmitting signals, such as a cell tower, a mobile switching center, a base station, and a wireless access point.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A device for displaying a single focus comprising:
   memory for storing a program; and
   a processor, functionally coupled to the memory, the processor being responsive to computer-executable instructions contained in the program and operative to:
   displaying a piece of content in a first application on a display;
   enlarging the piece of content to create a single focus on the piece of content on the display for a user;
   passing parameters of the piece of content to a second application;
   duplicating the piece of content as an identical piece of content in the second application, wherein the identical piece of content is, from a point of view, visually positioned behind the piece of content on the display so as not to be visually seen;
   seamlessly swapping the piece of content of the first application with the identical piece of content of the second application, so that the identical piece of content is visually positioned on the display to be viewable by the user; and
   visually presenting tools of the second application in an incremental transition until the tools are viewable on the display and available to the user.

2. The device of claim 1, further comprising loading the tools of the second application while visually maintaining the single focus on the piece of content on the display, the tools being related to the piece of content.

3. The device of claim 1, wherein enlarging the piece of content to create a single focus on the piece of content on the display of the device for a user comprises enlarging the piece of content in at least one of a horizontal direction and a vertical direction until the piece of content covers any other content.

4. A computer program product, tangibly embodied on a non-transitory computer readable medium, the computer program product including instructions for causing a computer to execute a method for displaying a single focus, comprising:
   displaying a piece of content in a first application on a display;
   enlarging the piece of content to create a single focus on the piece of content on the display for a user;
   passing parameters of the piece of content to a second application;
   duplicating the piece of content as an identical piece of content in the second application, wherein the identical piece of content is, from a point of view, positioned behind the piece of content on the display so as not to be visually seen;
   seamlessly swapping the piece of content of the first application with the identical piece of content of the second application, so that the identical piece of content is visually positioned on the display to be viewable by the user; and
   visually presenting tools of the second application in an incremental transition until the tools are viewable on the display and available to the user.

* * * * *